(12) United States Patent
Mukherjee et al.

(10) Patent No.: US 10,678,874 B2
(45) Date of Patent: Jun. 9, 2020

(54) METHOD AND SYSTEM FOR RECOMMENDATION OF A SUCCESSION OF ONE OR MORE SERVICES FOR A SERVICE WORKFLOW

(71) Applicant: Conduent Business Services, LLC, Dallas, TX (US)

(72) Inventors: Tridib Mukherjee, Bangalore (IN); Varun Sharma, Kolkata (IN); Aditya Hegde, Bangalore (IN); Shruti Kunde, Mumbai (IN)

(73) Assignee: CONDUENT BUSINESS SERVICES, LLC, Florham Park, NJ (US)

( * ) Notice: Subject to any disclaimer, the term of this patent is extended or adjusted under 35 U.S.C. 154(b) by 863 days.

(21) Appl. No.: 15/140,559

(22) Filed: Apr. 28, 2016

(65) Prior Publication Data

US 2017/0316096 A1 Nov. 2, 2017

(51) Int. Cl.
*G06F 16/00* (2019.01)
*G06F 16/9535* (2019.01)
*H04L 29/08* (2006.01)
*G06F 16/248* (2019.01)
*G06F 16/2457* (2019.01)

(52) U.S. Cl.
CPC ........ *G06F 16/9535* (2019.01); *G06F 16/248* (2019.01); *G06F 16/24575* (2019.01); *H04L 67/10* (2013.01)

(58) Field of Classification Search
CPC ............. G06F 16/24575; G06F 16/248; G06F 16/9535
See application file for complete search history.

(56) References Cited

U.S. PATENT DOCUMENTS

2006/0161655 A1* 7/2006 Altenhofen ............. G06F 16/95 709/224
2012/0016678 A1* 1/2012 Gruber .................. G10L 15/22 704/275

(Continued)

OTHER PUBLICATIONS

Zhongnan Shen and Jianwen Su, "Web service discovery based on behavior signatures," IEEE International Conference on Services Computing, Jul. 2005.

(Continued)

*Primary Examiner* — Dinku W Gebresenbet
(74) *Attorney, Agent, or Firm* — Jones Robb, PLLC

(57) ABSTRACT

A method and a system for recommendation of a succession of one or more services for a service workflow are disclosed. In an embodiment, a query is received to retrieve one or more services from a repository of a plurality of services stored in a hierarchical structure. The hierarchical structure comprises a plurality of hierarchical levels, each hierarchical level in the plurality of hierarchical levels comprising a set of nodes. Each node in the set of nodes in each hierarchical level, stores a first semantic information and a second semantic information. Further, the query is compared with the first semantic information and the second semantic information associated with a first node. The first node or the second node is selected based on the comparison. Further, the first set of services or the combination of services, associated with the selected node is recommended, as the service workflow, to the user.

17 Claims, 10 Drawing Sheets

(56) References Cited

U.S. PATENT DOCUMENTS

2012/0185793 A1* 7/2012 Binsztok ............... G06Q 10/02
715/772
2013/0138586 A1* 5/2013 Jung ..................... G06N 20/00
706/12
2014/0310053 A1* 10/2014 Liu ................... G06Q 10/0633
705/7.27

OTHER PUBLICATIONS

Brahim Medjahed, Athman Bouguettaya, and Ahmed K. Elmagarmid. "Composing Web services on the Semantic Web". The VLDB Journal 12, 4 (Nov. 2003), 333-351.

Xia Wang, Yihong Ding, Yi Zhao, "Similarity Measurement about Ontology-based Semantic Web Services", Workshop on Semantics for Web Services, SemWS, 2006.

Debajyoti Mukhopadhyay, and Archana Chougule, "A Survey on Web Service Discovery Approaches", Book Chapter in Springer Berlin Heidelberg book on Advances in Computer Science, Engineering, and Applications. 2012.

Zahira Chouiref, Abdelkader Belkhir, Allel Hadjali, Enhancing Semantic Web Services Discovery Using Similarity of Contextual Profile, Proceedings of the International Conference on Internet and Web Applications and Services, Italy (ICIW13), 2013.

Daniela Barreiro Claro, Oriana Licchelli, Patrick Albers, Raimundo José de Araújo Macêdo, "Personalized Reliable Web Service Compositions", 3rd Workshop on Ontologies and their Applications, WONTO 2008.

* cited by examiner

METHOD AND SYSTEM FOR RECOMMENDATION OF A SUCCESSION OF ONE OR MORE SERVICES FOR A SERVICE WORKFLOW

TECHNICAL FIELD

The presently disclosed embodiments are related, in general, to a shared service platform. More particularly, the presently disclosed embodiments are related to method and system for recommendation of a succession of one or more services for a service workflow, on the shared service platform.

BACKGROUND

With ever-increasing advancements in the field of cloud-computing based environment, discovery and recommendation of services have become more diverse. The behavior and technical interfaces for discovering a service is well known in static environment in which the user has advanced knowledge of specific keywords associated with the service, necessary for the successful discovery of the service. For example, Universal Description Discovery and Integration (UDDI) specifications define a registry service for web services and for other electronic and non-electronic services. UDDI requires very fine grained keywords from the user, for example, type of services, specific inputs and outputs, for the service discovery. However, the search function of UDDI is limited to syntax-based keyword search, and thus, fails to enable semantic description of its content.

In certain scenarios, the user may not have advanced knowledge of the specific keywords associated with the service. In such scenarios, it would be desirable to discover and recommend the service based on domain semantics of the service, to the user. Further, in another scenario, a single service may not serve the requirement of a query provided by the user, but a workflow of one or more services may serve the requirement of the query. In such scenario, it may be required to recommend a succession of one or more services for a service workflow to the user.

Further limitations and disadvantages of conventional and traditional approaches will become apparent to one of skilled in the art through a comparison of the described systems with some aspects of the present disclosure, as set forth in the remainder of the present application and with reference to the drawings.

SUMMARY

According to embodiments illustrated herein, there is provided a method for recommendation of a succession of one or more services for a service workflow, the method includes receiving a query to retrieve one or more services from a repository of a plurality of services stored in a hierarchical structure. The hierarchical structure comprises a plurality of hierarchical levels, each hierarchical level in the plurality of hierarchical levels comprising a set of nodes. A first node in the set of nodes in a first hierarchical level of the plurality of hierarchical levels represents a first set of services of the plurality of services. A second node in the set of nodes in a second hierarchical level of the plurality of hierarchical levels, represents a combination of services, in succession, of the plurality of services. The combination of services comprises at least the first set of services and other services from the plurality of services. The second node is a child node of the first node, and each node in the set of nodes in each hierarchical level of the plurality of hierarchical levels, stores a first semantic information and a second semantic information. The method further includes, comparing the query with the first semantic information and the second semantic information associated with the first node. The method further includes, selecting the first node or the second node based on the comparison. The method further includes, recommending the first set of services or the combination of services, as the itinerary, associated with the selected node.

According to embodiments illustrated herein, there is provided a system for recommendation of a succession of one or more services for an itinerary. The system include one or more processors, configured to receive a query to retrieve one or more services from a repository of a plurality of services stored in a hierarchical structure. The hierarchical structure comprises a plurality of hierarchical levels, each hierarchical level in the plurality of hierarchical levels comprising a set of nodes. A first node in the set of nodes in a first hierarchical level of the plurality of hierarchical levels, represents a first set of services of the plurality of services. A second node in the set of nodes in a second hierarchical level of the plurality of hierarchical levels represents a combination of services, in succession, of the plurality of services. The combination of services comprises at least the first set of services and other services from the plurality of services. The second node is a child node of the first node, and each node in the set of nodes in each hierarchical level of the plurality of hierarchical levels, stores a first semantic information and a second semantic information. The one or more processors may further be configured to compare the query with the first semantic information and the second semantic information associated with the first node. The one or more processors may further be configured to select the first node or the second node based on the comparison. The one or more processors may further be configured to recommend the first set of services or the combination of services, as the itinerary, associated with the selected node.

According to embodiments illustrated herein, there is provided a non-transitory computer-readable storage medium having stored thereon, a set of computer-executable instructions for recommendation of a succession of one or more services for an itinerary. The set of computer-executable instructions is executable by a computer comprising one or more processors to perform step including receiving a query to retrieve one or more services from a repository of a plurality of services stored in a hierarchical structure. The hierarchical structure comprises a plurality of hierarchical levels, each hierarchical level in the plurality of hierarchical levels comprising a set of nodes. A first node in the set of nodes in a first hierarchical level of the plurality of hierarchical levels represents a first set of services of the plurality of services. A second node in the set of nodes in a second hierarchical level of the plurality of hierarchical levels represents a combination of services, in succession, of the plurality of services. The combination of services comprises at least the first set of services and other services from the plurality of services. The second node is a child node of the first node, and each node in the set of nodes in each hierarchical level of the plurality of hierarchical levels, stores a first semantic information and a second semantic information. The one or more processors may further be configured to perform step including, comparing the query with the first semantic information and the second semantic information associated with the first node. The one or more processors may further be configured to perform step including, selecting the first node or the second node based on the comparison. The one or more processors may further be configured to perform step including, recommending the first set of services or the combination of services, as the itinerary, associated with the selected node.

BRIEF DESCRIPTION OF DRAWINGS

The accompanying drawings illustrate various embodiments of systems, methods, and other aspects of the disclosure. Any person having ordinary skills in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
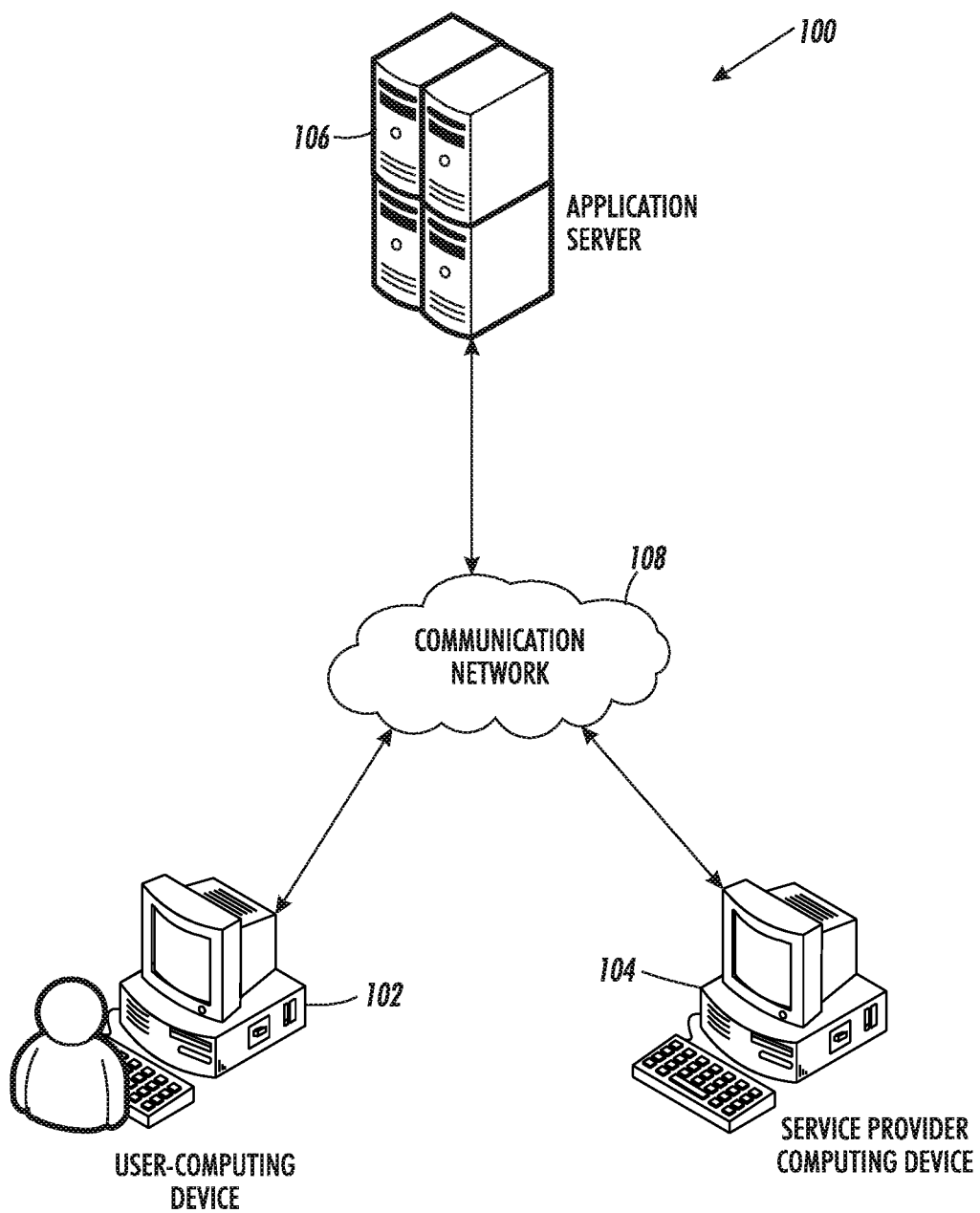
FIG. 1 is a block diagram that illustrates a system environment in which various embodiments of the system may be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "at least one embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

"Service" refers to an intangible commodity that may be offered to a user. The user may utilize the service to achieve or work towards a predetermined goal. For example, a user wishes to travel from location A to location B. The user may book a ticket to travel by an airplane or a railway. The platform that allows the user to book the ticket may correspond to a service that is offered to the user. A service provider may register one or more services on a shared service platform. In an embodiment, the service registered by the service provider may be represented by a node in a hierarchical structure. Example of the one or more services may include, but are not limited to, a flight booking service, a hotel booking service, a business processing service, customer care service, knowledge processing service, communication service, and the like.

"Hierarchical structure" refers to a structure that comprises a plurality of hierarchical levels arranged in a tree-like manner. In an embodiment, a plurality of nodes may be arranged in the hierarchical structure. In an embodiment, each hierarchical level in the plurality of hierarchical levels comprises a set of nodes of the plurality of nodes.

"First set of services" refers to one or more services that may be represented by a first node in a hierarchical structure. For example, the first set of services may include, but are not limited to, a hotel booking service, a flight booking service, a cab booking service, and the like. In an embodiment, the first set of services may further include combination of services.

"Combination of services" corresponds to a combination of one or more services of a plurality of services stored in a hierarchical structure. The combination of services comprises at least the first set of services and other services from the plurality of services. The combination of services may be processed such that the first set of services is processed first, followed by the other services of the plurality of services. In an embodiment, the combination of services may be determined based on composability of the one or more services. In an embodiment, the combination of services may be represented by a second node in a hierarchical structure. For example, the combination of services may include, but are not limited to, a hotel and flight booking service, a flight and cab booking service, and the like. For example, the combination of services, such as "hotel and flight booking service" represented by the second node may be processed such that the hotel booking service is processed first, followed by the flight booking service. Such a combination of services that represents an ordered execution of services may be referred to as a service workflow.

"Composability" refers to a method that is known in the prior art to check whether one or more services are interactive with each other. An example of such method may include, but is not limited to, a "Distributed Algorithm for Web Service Composition (DPAWSC)". For example, a hotel booking service may be interactive with a flight booking service. Hence, the hotel booking service and the flight booking service are composable with each other.

A "repository" refers to a collection of a plurality of services stored in a hierarchical structure. The hierarchical structure comprises a plurality of hierarchical levels, each hierarchical level in the plurality of hierarchical levels comprises a set of nodes. In an embodiment, a first node in the set of nodes in a first hierarchical level of the plurality of hierarchical levels, represents a first set of services of the plurality of services. A second node in the set of nodes in a second hierarchical level of the plurality of hierarchical levels, represents a combination of services, in succession, of the plurality of services. In an embodiment, the combination of services comprises at least the first set of services and other services from the plurality of services. The second node is a child node of the first node. Further, each node in the set of nodes in each hierarchical level of the plurality of hierarchical levels, stores a first semantic information and a second semantic information.

"First node" represents a first set of services of a plurality of services in a repository. Each node in a set of nodes in a first hierarchical level of a plurality of hierarchical levels may be represented as the first node.

"Second node" represents a combination of services of a plurality of services in a repository. Each node in a set of nodes in a second hierarchical level of a plurality of hierarchical levels may be represented as the second node. In an embodiment, the second node is a child node of a first node in a hierarchical structure.

"Domain ontology graph" refers to semantic information (i.e., meaning) of a service. In an embodiment, the semantic information may include both vocabulary semantics and concept semantics of the service. For example, semantic information of the service, such as "a hotel booking service" may include, but is not limited to, room booking, room reservation, accommodation, general hotel information, hotel facilities, nearby points of interest, and the like. The room booking, room reservation, accommodation, and the like, may correspond to vocabulary semantics of the hotel booking service. The general hotel information, hotel facilities, nearby points of interest, and the like, may correspond to concept semantics of the hotel booking service.

"First semantic information" refers to a domain ontology graph of a first set of services represented by a first node. In an embodiment, the first semantic information may be stored in the first node. For example, the first semantic information of a hotel booking service (that is represented by the first node) may include, but not limited to, room booking, room reservation, accommodation, general hotel information, hotel facilities, nearby points of interest, and the like.

"Second semantic information" refers to a domain ontology graph of a combination of services, represented by a second node. In an embodiment, the second semantic information is stored in a first node. For example, the second semantic information of a hotel and flight booking service combination may include, but not limited to, accommodation and economy class flight booking, suites and business class flight booking, and the like.

A "service matching list" refers to a list of one or more services that may be generated for a query of a user. The service matching list (SML) may be generated based on matching of the one or more services with the query. In an embodiment, the one or more services in the SML may be sorted based on a pre-defined parameter (i.e. service level agreement) or a preference of the user.

FIG. 1 is a block diagram that illustrates a system environment 100 in which various embodiments of a method and a system may be implemented. The system environment 100 includes a user-computing device 102, a service provider computing device 104, an application server 106, and a communication network 108. Various devices in the system environment 100 may be interconnected over the communication network 108. FIG. 1 shows, for simplicity, one user-computing device 102, one service provider computing device 104, and one application server 106. However, it will be apparent to a person having ordinary skills in the art that the disclosed embodiments may also be implemented using multiple user-computing devices, multiple service provider computing devices, and multiple application servers without departing from the scope of the disclosure.

The user-computing device 102 may comprise one or more processors in communication with one or more memories. The one or more memories may include one or more computer readable codes, instructions, programs, or algorithms that are executable by the one or more processors to perform one or more predetermined operations. The user-computing device 102 may communicate with the application server 106 through the communication network 108 (e.g., using wired or wireless communication capabilities). The user-computing device 102 associated with a user, may transmit a query to a shared service platform, to retrieve one or more services. In an embodiment, the user-computing device 102 may receive a service matching list (SML) based on matching of the query with the one or more services. Examples of the user-computing device 102 may include, but are not limited to, a desktop computer, a laptop, a personal digital assistant (PDA), a mobile device, a smart phone, a tablet computer (e.g., iPad® and Samsung Galaxy Tab®), and/or the like.

The service provider computing device 104 may comprise one or more processors in communication with one or more memories. The one or more memories may include one or more computer readable codes, instructions, programs, or algorithms that are executable by the one or more processors to perform one or more predetermined operations. The service provider computing device 104 may communicate with the application server 106 through the communication network 108 (e.g., using wired or wireless communication capabilities). A service provider associated with the service provider computing device 104 may register one or more services at the shared service platform hosted by the application server 106. Example of the service provider may include, but are not limited to, a hotel owner, travel agency owner, and/or the like. Examples of the service provider computing device 104 may include, but are not limited to, a desktop computer, a laptop, a personal digital assistant (PDA), a mobile device, a smart phone, a tablet computer (e.g., iPad® and Samsung Galaxy Tab®), and/or the like.

The application server 106 may comprise one or more processors in communication with one or more memories. The one or more memories may include one or more computer readable codes, instructions, programs, or algorithms that are executable by the one or more processors to perform one or more predetermined operations. The application server 106 may receive a query from the user-computing device 102, to retrieve the one or more services from a repository. The repository may include information pertaining to a plurality of services stored in a hierarchical structure. In an embodiment, the hierarchical structure comprises a plurality of hierarchical levels. Each hierarchical level in the plurality of hierarchical levels comprises a set of nodes. A first node in the set of nodes in a first hierarchical level of the plurality of hierarchical levels, represents a first set of services of the plurality of services. A second node in the set of nodes in a second hierarchical level of the plurality of hierarchical levels, represents a combination of services of the plurality of services. The combination of services comprises at least the first set of services and other services from the plurality of services. In an embodiment, each node in the set of nodes in each hierarchical level of the plurality of hierarchical levels, stores a first semantic information and a second semantic information.

The application server 106 may compare the query with a first semantic information associated with a first node. In an embodiment, the application server 106 may be configured to determine a first matching score, based on comparison of the query with the first semantic information associated with the first node. The application server 106 may be configured to select the first node, if the first matching score exceeds a threshold score. Further, if the first matching score is less than the threshold score, the application server 106 may compare the query with the second semantic information associated with the first node. Based on the comparison, the application server 106 may be configured to determine a second matching score for the first node. Further, the application server 106 may compare the second matching score with the threshold score. In an embodiment, the application server 106 may further be configured to discard the first node, if the second matching score is less than the threshold score. In an embodiment, when the first matching score is less than the threshold score and the second matching score exceeds the threshold score, the application server 106 may further be configured to compare the query with the first semantic information of the second node. Further, the application server 106 may determine a first matching score for the second node, based on the comparison. The first matching score of the second node may be compared with the threshold score. The application server 106 may select the second node if the first matching score of the second node exceeds the threshold score. In an embodiment, the application server 106 recommends the combination of services, represented by the second node. Examples of the application server 106 may include, but are not limited to, a relational database server, a SAP server, a PeopleSoft® server, a Siebel server, and the like. For querying the application server 106, one or more querying languages may be utilized such as, but not limited to, Structured Query Language (SQL), QUEry Language (QUEL), Data Mining Extensions (DMX) and so forth. In an embodiment, the user-computing device 102 may connect to the application server 106 using one or more protocols such as, but not limited to, Open Data Base Connectivity (ODBC) protocol and Java Data Base Connectivity (JDBC) protocol.

The communication network 108 may include a medium through which devices, such as the user-computing device 102, the service provider computing device 104, and the application server 106, may communicate with each other. Examples of the communication network 108 may include, but are not limited to, the Internet, a cloud network, a Wireless Fidelity (Wi-Fi) network, a Wireless Local Area Network (WLAN), a Local Area Network (LAN), a plain old telephone service (POTS), and/or a Metropolitan Area Network (MAN). Various devices in the system environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, such as Long Term Evolution (LTE), and/or Bluetooth (BT) communication protocols.

Figure 2:
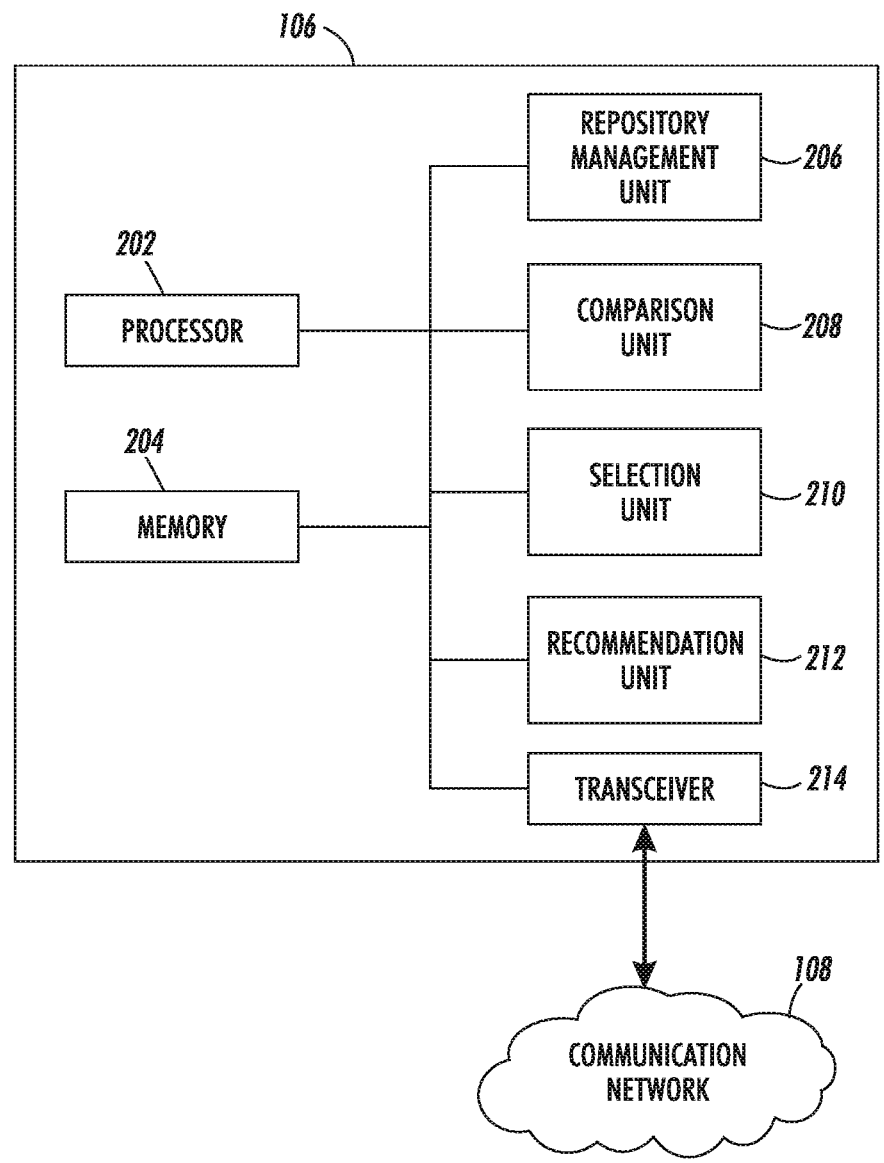
FIG. 2 is a block diagram that illustrates various components of an application server, in accordance with at least one embodiment.

FIG. 2 is a block diagram 200 that illustrates various components of the application server 106, in accordance with at least one embodiment. FIG. 2 is explained in conjunction with the FIG. 1. The application server 106 may include one or more processors, such as a processor 202, one or more memories, such as a memory 204, one or more repository management units, such as a repository management unit 206, one or more comparison units, such as a comparison unit 208, one or more selection units, such as a selection unit 210, one or more recommendation units, such as a recommendation unit 212, and one or more transceivers, such as a transceiver 214. A person with ordinary skills in the art will appreciate that the scope of the disclosure is not limited to the components as described herein.

The processor 202 may comprise suitable logic, circuitry, interface, and/or code that may be configured to execute one or more sets of instructions stored in the memory 204. The processor 202 may be communicatively coupled to the memory 204, the repository management unit 206, the comparison unit 208, the selection unit 210, the recommendation unit 212, and the transceiver 214. The processor 202 may execute the one or more sets of instructions, programs, codes, and/or scripts stored in the memory 204 to perform the one or more predetermined operations. For example, the processor 202 may work in coordination with the memory 204, the repository management unit 206, the comparison unit 208, the selection unit 210, the recommendation unit 212, and the transceiver 214, to recommend one or more services to the user. The processor 202 may be implemented based on a number of processor technologies known in the art. Examples of the processor 202 include, but are not limited to, an X86-based processor, a Reduced Instruction Set Computing (RISC) processor, an Application-Specific Integrated Circuit (ASIC) processor, a Complex Instruction Set Computing (CISC) processor, a microprocessor, a microcontroller, and/or the like.

The memory 204 may comprise suitable logic, circuitry, and/or interfaces that may be configured to store one or more machine codes, and/or computer programs having at least one code section executable by the processor 202. The memory 204 may be further configured to store the one or more sets of instructions, codes, and/or scripts. In an embodiment, the memory 204 may be configured to store the repository of the plurality of services that may be received from the service provider computing device 104. Examples of the commonly known memory implementations may include, but are not limited to, a random access memory (RAM), a read only memory (ROM), a hard disk drive (HDD), and a secure digital (SD) card. It will be apparent to a person having ordinary skills in the art that the one or more sets of instructions, programs, codes, and/or scripts stored in the memory 204 may enable the hardware of the application server 106 to perform the one or more predetermined operations.

The repository management unit 206 may comprise suitable logic, circuitry, and/or interfaces that may be configured to manage the repository of the plurality of services, stored in the memory 204. The repository management unit 206 may be configured to store the plurality of services in the hierarchical structure that comprises the plurality of hierarchical levels. Each hierarchical level in the plurality of hierarchical levels comprises the set of nodes. The first node in the set of nodes in the first hierarchical level of the plurality of hierarchical levels, represents the first set of services of the plurality of services. The second node in the set of nodes in the second hierarchical level of the plurality of hierarchical levels, represents the combination of services of the plurality of services. The combination of services comprises at least the first set of services and other services from the plurality of services. The second node may be a child node of the first node. Each node in the set of nodes in each hierarchical level of the plurality of hierarchical levels, stores the first semantic information and the second semantic information. In an embodiment, the first semantic information, at the first node, corresponds to domain ontology graph of the first set of services represented by the first node. In an embodiment, the second semantic information, at the first node, corresponds to the domain ontology graph of the combination of services that is represented by the second node. The repository management unit 206 may be configured to update the repository when a new service at any hierarchical level is registered by the service provider. In an embodiment, the repository management unit 206 may update both the first semantic information and the second semantic information associated with each node in the repository, when the new service is registered by the service provider. The process of registration of the new service has been described later in conjunction FIG. 4. Further, the repository management unit 206 may be configured to update the repository when a service is deleted from the repository. Further, the first semantic information and the second semantic information associated with each node in the repository may be updated, when the service is deleted from the repository. In an embodiment, the repository management unit 206 may be implemented as an Application-Specific Integrated Circuit (ASIC) microchip designed for a special application, such as to manage the repository of the plurality of services.

The comparison unit 208 may comprise suitable logic, circuitry, and/or interfaces that may be configured to compare the query provided by the user, with the first semantic information and the second semantic information associated with a node in the hierarchal structure. For example, the comparison unit 208 may compare the query with the first semantic information and the second semantic information associated with the first node. In an embodiment, based on the comparison, the comparison unit 208 may determine the first matching score and the second matching score for the first node. In an embodiment, the first matching score of the first node may be utilized to determine whether the first node may be selected. In an embodiment, the second matching score of the first node may be utilized to determine whether the query may be compared with the first semantic information and the second semantic information associated with the second node. In an embodiment, the comparison unit 208 may be implemented as an Application-Specific Integrated Circuit (ASIC) microchip designed for a special application, to compare the query with the first semantic information and the second semantic information associated with the first node or the second node.

The selection unit 210 may comprise suitable logic, circuitry, and/or interfaces that may be configured to select the first node (that represent the first set of services) from the first hierarchical level, based on comparison of the query with the first semantic information associated with the first node. In an embodiment, the selection unit 210 may utilize one or more techniques known in the prior art, such as "A* algorithm", to select the first node. For example, the selection unit 210 may be configured to select the first node, when the first matching score of the first node exceeds a threshold score. The first matching score of the first node may be determined by the comparison unit 208, based on comparison of the query with the first semantic information of the first node. In another example, the selection unit 210 may be configured to select the second node, when the first matching score of the second node exceeds the threshold score. The first matching score of the second node may be determined by the comparison unit 208, based on comparison of the query with the first semantic information of the second node. In an embodiment, the selection unit 210 may be implemented as an Application-Specific Integrated Circuit (ASIC) microchip designed for a special application, such as to select the first node or the second node.

The recommendation unit 212 may comprise suitable logic, circuitry, and/or interfaces that may be configured to recommend one or more services, represented by one or more nodes that are selected by the selection unit 210. The one or more selected nodes may be the first node or the second node. In an embodiment, the recommendation unit 212 may recommend the first set of services (represented by the first node) and/or the combination of services (represented by the second node) in the form of a service matching list (SML). In an embodiment, the recommendation unit 212 may further be configured to generate the SML by sorting the one or more selected nodes for recommendation. The sorting of the one or more selected nodes may be performed based on the preference set by the user in the query. In an exemplary scenario, the query is provided as, "I prefer a hotel that have spa facility". In such scenario, the recommendation unit 212 may sort the selected node on top of the SML that represent "a hotel with spa facility" and the other selected node on bottom of the SML that represent "a hotel with swimming pool facility", and the like. In an embodiment, the recommendation unit 212 may be configured to recommend the succession of the one or more services as the itinerary. In an embodiment, the recommendation unit 212 may be implemented as an Application-Specific Integrated Circuit (ASIC) microchip designed for a special application, such as to recommend the one or more services to the user.

The transceiver 214 may comprise suitable logic, circuitry, interface, and/or code that may be configured to communicate with one or more user-computing devices, such as the user-computing device 102, and one or more service provider computing device, such as the service provider computing device 104, over the communication network 108. The transceiver 214 may be configured to transmit or receive the one or more sets of instructions, queries, and/or other information to/from various components of the system environment 100. The transceiver 214 may implement one or more known technologies to support wired or wireless communication with the communication network 108. In an embodiment, the transceiver 214 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 214 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

Figure 3A:
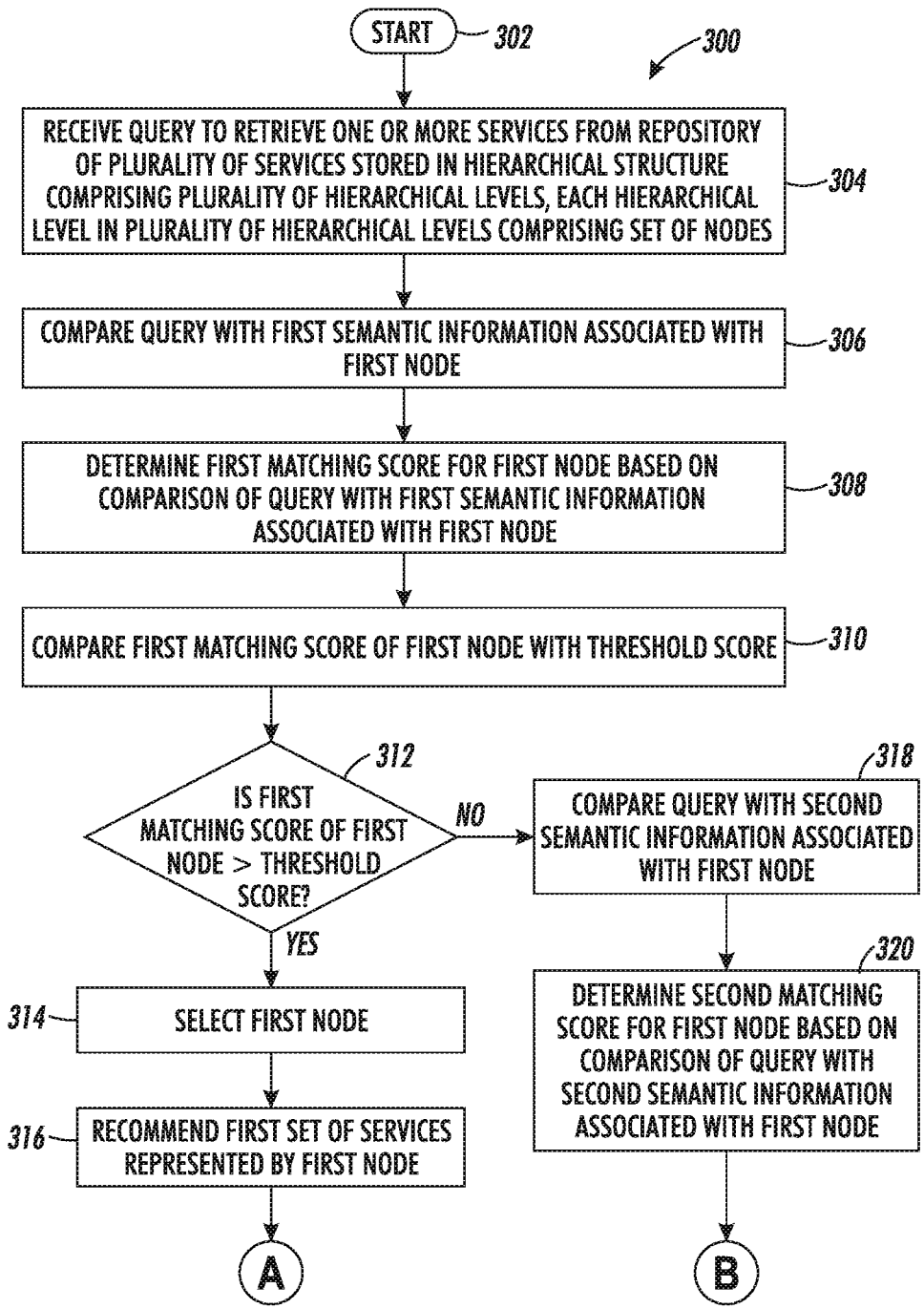
FIGS. 3A and 3B illustrate a flowchart of a method for recommendation of a succession of one or more services for a service workflow, such as an itinerary, in accordance with at least one embodiment.
Figure 3B:
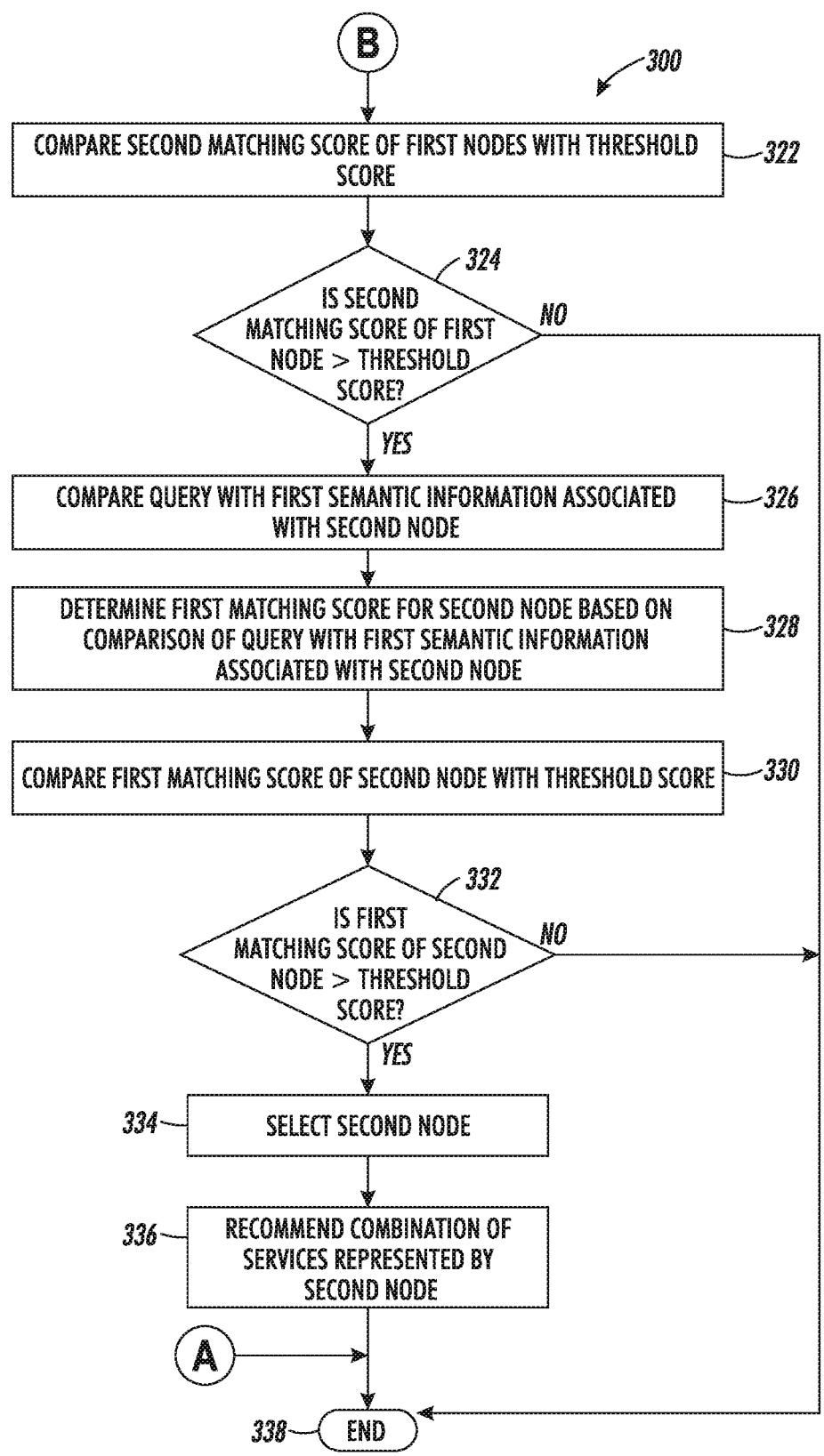

FIGS. 3A and 3B illustrate a flowchart 300 of a method for recommendation of a succession of one or more services for a service workflow, such as an itinerary, in accordance with at least one embodiment. The flowchart 300 is described in conjunction with FIG. 1 and FIG. 2. The method starts at step 302 and proceeds to step 304.

At step 304, a query may be received to retrieve one or more services from the repository of the plurality of services. In an embodiment, the processor 202 in conjunction with the transceiver 214 may be configured to receive the query through the shared service platform. The user may provide the query on the shared service platform by using the user-computing device 102. In an embodiment, the plurality of services may be stored in the hierarchical structure that comprises the plurality of hierarchical levels. Each hierarchical level in the plurality of hierarchical levels comprises the set of nodes.

Further, the first node in the set of nodes in the first hierarchical level of the plurality of hierarchical levels, represents the first set of services of the plurality of services. The second node in the set of nodes in the second hierarchical level of the plurality of hierarchical levels, represents a combination of services, in succession, of the plurality of services. In an embodiment, the combination of services comprises at least the first set of services and other services from the plurality of services. In an embodiment, the first node is a parent node of the second node. In general, a subtree rooted at "$i^{th}$" node represents all possible workflows that start with service "i", or in other words, all workflows where service "i" is followed by other services.

In an embodiment, each node in the set of nodes in each hierarchical level of the plurality of hierarchical levels stores the first semantic information and the second semantic information. The first semantic information associated with the first node corresponds to a domain ontology graph of the first set of services associated with the first node. The second semantic information associated with the first node corresponds to a domain ontology graph of the combination of services represented by the second node. For example, the plurality of services in the repository is "n", the first semantic information of the "$i^{th}$" node may be depicted as:

$$Sem(i) = \Sigma \text{semantics of service of } i^{th} \text{ node} \quad (1)$$

where,

"Sem(i)" represents the first semantic information of the "$i^{th}$" node.

The second semantic information of the "$i^{th}$" node may be depicted, in a recursive manner, as:

$$SemSubTree(i) = U_{j \in child(i)} Sem(j) U_{j \in child(i)} SemSubTree(j) \quad (2)$$

where,

"Child(i)" represents the set of child nodes of the "$i^{th}$" node,

"Sem(j)" represents the first semantic information of the "$j^{th}$" node, and

"SemSubTree(j)" represents the second semantic information of the "$j^{th}$" node.

In an embodiment, the "SemSubTree(i)" represents the second semantic information of the "$i^{th}$" node. For example, if the "$i^{th}$" node represent "a hotel booking service", the first semantic information "Sem(i)" of the "$i^{th}$" node may include hotel booking service, room reservation service, hotel contact information (i.e., name, address, contact number, and the like), hotel general information (i.e., classification of rooms, check-in and check-out time, booking rate, and the like), hotel facilities (i.e., spa, gym, bar, and the like), and nearby point-of-interest (POI) that include, Indian restaurants, Chinese restaurants, water fall, national park, and the like. Further the second semantic information "SemSubTree(i)" of the "$i^{th}$" node may include, hotel and flight booking, hotel and cab booking, hotel and flight contact information, hotel and flight facilities, and the like. Table 1 provided below illustrates an exemplary instance of the "Sem(i)" and the "SemSubTree(i)" of the "$i^{th}$" node:

TABLE 1

| Illustration of "Sem(i)" and "SemSubTree(i)" of the "$i^{th}$" node | |
|---|---|
| Sem(i) | SemSubTree(i) |
| Hotel booking | (Hotel and Flight) booking |
| Room reservation | (Hotel and Cab) booking |
| Hotel contact information | (Hotel and Flight) contact information |
| Hotel general information | (Hotel and Flight) facilities |
| Hotel facilities | (Hotel and Cab) facilities |
| Nearby POIs | |

It will be apparent to a person having ordinary skills in the art that the above Table 1 has been provided only for illustration purposes and should not limit the scope of the invention to the listed services only. For example, listed services included in the Table 1 may be different from depicted services.

After receiving the query from the user, the processor 202 may identify one or more keywords in the query. For example, the user may provide the query, such as, "I prefer hotels with lots of Indian restaurants in their vicinity". The processor 202 may identify one or more keywords, such as "hotels" and "Indian restaurants in vicinity", in the query.

At step 306, the query may be compared with the first semantic information associated with the first node. In an embodiment, the comparison unit 208 may compare the query with the first semantic information of the first node. For example, the identified one or more keywords, such as "hotels" and "Indian restaurants in vicinity" in the query, may be compared with the first semantic information "Sem(i)" of the "$i^{th}$" node.

At step 308, a first matching score may be determined for the first node based on the comparison of the query with the first semantic information associated with the first node. The comparison unit 208 may be configured to determine the first matching score, such as "$s_1$", for the first node based on the comparison of the query with the first semantic information associated with the first node. For example, the first matching score "$s_1$" of the first node maybe determined based on comparison of the identified one or more keywords, i.e., "hotels" and "Indian restaurants in vicinity", in the query with the first semantic information "Sem(i)" of the "$i^{th}$" node.

At step 310, the first matching score "$s_1$" of the first node maybe compared with a threshold score "$s_t$". Further, at step 312, the comparison unit 208 may be configured to check whether the first matching score "$s_1$" of the first node is greater than the threshold score "$s_t$". If the first matching score "$s_1$" of the first node is greater than the threshold score "$s_t$", step 314 may be performed. If the first matching score "$s_1$" of the first node is less than the threshold score "$s_t$", step 318 may be performed.

At step 314, the first node may be selected if the first matching score "$s_1$" of the first node is greater than the threshold score "$s_t$". The selection unit 210 may be configured to select the first node based on the comparison. For example, it may be observed from the Table 1 that the identified one or more keywords, such as "hotels" and "Indian restaurants in vicinity", in the query, matches with the "Sem(i)" of the "$i^{th}$" node. Hence, the first matching score "$s_1$" of the first node is greater than the threshold score "$s_t$". Therefore, the "$i^{th}$" node is selected by the selection unit 210. In certain scenario, the identified one or more keywords, such as "hotels" and "Indian restaurants in vicinity", in the query fails to match with the "Sem(i)" of the "$i^{th}$" node, which indicated that the first matching score "$s_1$" of the first node is less than the threshold score "$s_t$". In such scenario, the selection unit 210 will not select the "$i^{th}$" node and proceed to step 318.

At step 316, the first set of services is recommended to the user. The recommendation unit 212 may be configured to select the first node to recommend the first set of services to the user, if the first matching score "$s_1$" of the first node is greater than the threshold score "$s_t$". In an embodiment, the recommendation unit 212 may generate the SML to include the first set of services represented by the "$i^{th}$" node. Control passes to end step 338.

At step 318, the query may be compared with the second semantic information associated with first node. In an embodiment, the comparison unit 208 may be configured to compare the query with the second semantic information associated with the first node. For example, the identified one or more keywords, such as "hotels" and "Indian restaurants in vicinity", in the query may be compared with the second semantic information "SemSubTree(i)" of the "$i^{th}$" node.

At step 320, a second matching score may be determined for the first node based on the comparison of the query with the second semantic information associated with the first node. The comparison unit 208 may be configured to determine the second matching score, such as "$s_2$", for the first node based on the comparison of the query with the second semantic information associated with the first node. For example, the second matching score "$s_2$" of the first node may be determined based on comparison of the identified one or more keywords, i.e., "hotels" and "Indian restaurants in vicinity", in the query with the second semantic information "SemSubTree(i)" of the "$i^{th}$" node.

At step 322, the second matching score "$s_2$" of the first node may be compared with the threshold score "$s_t$". Further, at step 324, the comparison unit 208 may be configured to check whether the second matching score "$s_2$" of the first node is greater than the threshold score "$s_t$". If the second matching score "$s_2$" of the first node is greater than the threshold score "$s_t$", step 324 may be performed. If the second matching score "$s_2$" of the first node is less than the threshold score "$s_t$", end step 338 may be performed. For example, it may be observed from the Table 1 that the "SemSubtree(i)" of the "$i^{th}$" node fails to match with the query, i.e., the identified one or more keywords, such as "hotels" and "Indian restaurants in vicinity", in the query fail to match with the "SemSubTree(i)" of the "$i^{th}$" node. Hence, the second matching score "$s_2$" of the first node will be less than the threshold score "$s_t$". Therefore, the selection unit 210 will discard the "$i^{th}$" node which means that the child nodes of the "$i^{th}$" node will not be traversed and compared with the query. In such scenarios, the selection unit 210 may compare the query with a new first node at the first level in the hierarchical structure. In a scenario, the identified one or more keywords, such as "hotels" and "Indian restaurants in vicinity", in the query may match with the "SemSubTree(i)" of the "$i^{th}$" node, which indicates that the second matching score "$s_2$" is greater than the threshold score "$s_t$". In such scenario, the query will be compared with each child node (i.e., each "$j^{th}$" node) of the "$i^{th}$" node.

At step 326, the query may be compared with the first semantic information associated with the second node. In an embodiment, the comparison unit 208 may be configured to compare the query with the first semantic information associated with the second node. For example, the query may be compared with the "$j^{th}$" node. In an embodiment, the "$j^{th}$" node may be associated with the first semantic information "Sem(j)" and the second semantic information "SemSubTree(j)". For example, the "$j^{th}$" node may represent a hotel and flight booking service. The first semantic information "Sem(j)" of the "$j^{th}$" node may include, hotel and flight booking, hotel and flight contact information, hotel and flight classes, hotel and flight facilities, and the like. Further, the second semantic information "SemSubTree(j)" of the "$j^{th}$" node may include, hotel and flight and cab booking, hotel and flight and cab contact information, hotel and flight and cab facilities, and the like. Table 2, as shown below, illustrates the "Sem(j)" and the "SemSubTree(j)" of the "$j^{th}$" node:

TABLE 2

Illustration of "Sem(j)" and "SemSubTree(j)" of the "$j^{th}$" node

| Sem(j) | SemSubTree(j) |
|---|---|
| (Hotel and Flight) booking | (Hotel and Flight and Cab) booking |
| (Hotel and flight) contact information | (Hotel and Flight and Cab) contact information |
| (Hotel and flight) facilities | (Hotel and Flight and Cab) facilities |

It will be apparent to a person having ordinary skills in the art that the above Table 2 has been provided only for illustration purposes and should not limit the scope of the invention to the listed services only. For example, listed services included in the Table 2 may be different from the depicted services.

At step 328, a first matching score may be determined for the second node based on the comparison of the query with the first semantic information associated with the second node. The comparison unit 208 may be configured to determine the first matching score, such as "$s_3$", for the second node based on the comparison of the query with the first semantic information associated with the second node. For example, the first matching score "$s_3$" of the second node may be determined based on comparison of the identified one or more keywords, i.e., "hotels" and "Indian restaurants in vicinity", in the query with the first semantic information "Sem(j)" of the "$j^{th}$" node.

At step 330, the first matching score "$s_3$" of the second node may be compared with the threshold score "$s_t$". Further, at step 332, the comparison unit 208 may be configured to check whether the first matching score "$s_3$" of the second node is greater than the threshold score "$s_t$". If the first matching score "$s_3$" of the second node is greater than the threshold score "$s_t$", step 334 may be performed. If the first matching score "$s_3$" of the second node is less than the threshold score "$s_t$", end step 338 may be performed for the second node.

At step 334, the second node may be selected if the first matching score "$s_3$" of the second node is greater than the threshold score "$s_t$". The selection unit 210 may select the second node to recommend the combination of services to the user, if the first matching score "$s_3$" of the second node is greater than the threshold score "$s_t$". For example, it may be observed from Table 2, that the "Sem(j)" of the "$j^{th}$" node fails to match with the query, i.e., the identified one or more keywords such as "hotels" and "Indian restaurants in vicinity" in the query, fail to match with the "Sem(j)" of the "$j^{th}$" node. Hence, the first matching score "$s_3$" of the second node will be less than the threshold score "$s_t$". Therefore, the $j^{th}$ node will not be selected by the selection unit 210. In a scenario, the identified one or more keywords, i.e., "hotels" and "Indian restaurants in vicinity", in the query match with the "Sem(j)" of the "$j^{th}$" node, which indicates that the first matching score "$s_3$" of the second node is greater than the threshold score "$s_t$". In such scenario, the selection unit 210 will select the "$j^{th}$" node.

At step 336, the combination of services represented by the second node may be recommended to the user. In an embodiment, the recommendation unit 212 may recommend the combination of services represented by the second node (i.e., "$j^{th}$" node) to the user. In an embodiment, the recommendation unit 212 may be configured to update the SML to include the combination of services represented by the "$j^{th}$" node. The SML may be updated with every selection of the first node and/or the second node.

In certain scenario, if the query matches with the one or more first nodes and the one or more second nodes in the hierarchical structure, the selection unit 210 may select the one or more first nodes and the one or more second nodes. In such scenario, the recommendation unit 212 may generate the SML to include the one or more services represented by the one or more first nodes and the one or more second nodes. Further, the recommendation unit 212 may perform sorting of the one or more services represented by the one or more first nodes and the one or more second nodes, based on the preference set by the user in the query. It may be observed from the user query that the user has preference of "a hotel which has Indian restaurants in the vicinity". In such scenario, the recommendation unit 212 may sort "the hotel which has Indian restaurants in vicinity", on top of the SML and "the hotel which has Chinese restaurants in the vicinity", at the bottom of the SML. In an embodiment, the recommendation unit 212 may be configured to recommend the one or more services (in accordance with the SML) represented by the one or more first nodes and the one or more second nodes to the user. In an embodiment, the recommendation unit 212 may be configured to recommend the succession of the one or more services as the itinerary. In an embodiment, the recommendation of the one or more services (in accordance with the SML) may be displayed on the user-computing device 102. Control passes to end step 338.

Figure 4:
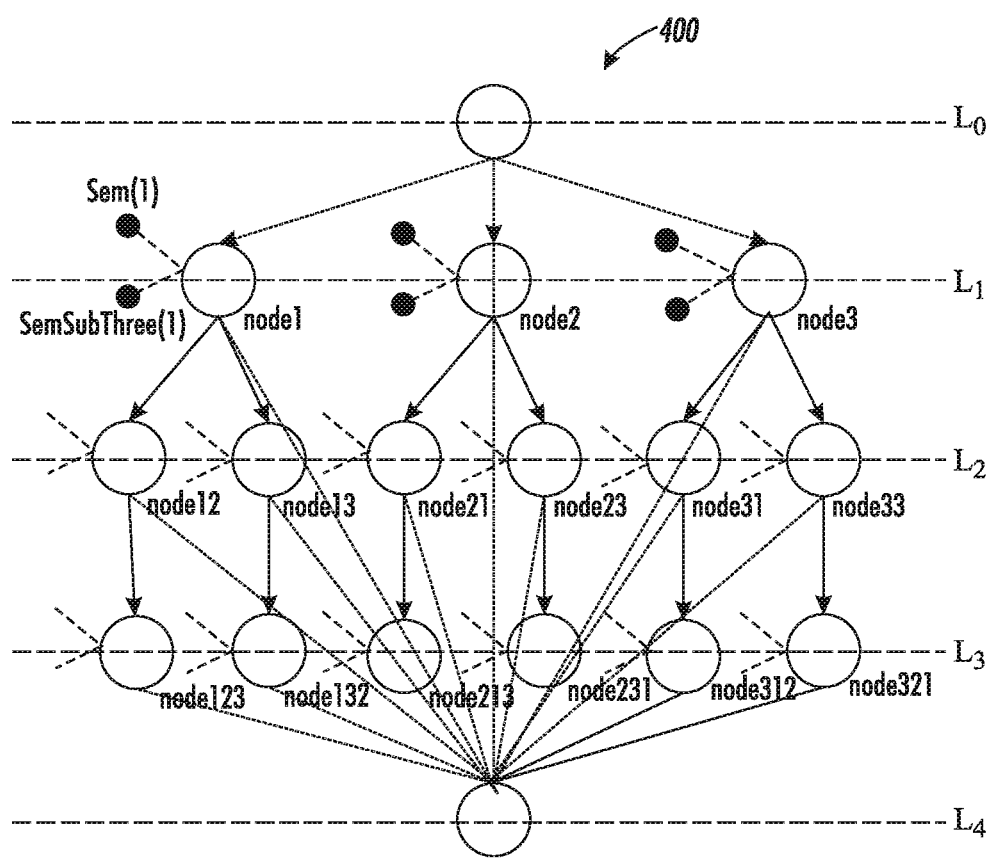
FIG. 4 is a block diagram that illustrates a hierarchical structure of a repository, in accordance with at least one embodiment.

FIG. 4 is a block diagram that illustrates a hierarchical structure 400 in a repository, in accordance with at least one embodiment. FIG. 4 is explained in conjunction with FIGS. 1-3. The hierarchical structure 400 represents a plurality of hierarchical levels, such as a zeroth hierarchical level "$L_0$", a first hierarchical level "$L_1$", a second hierarchical level "$L_2$", a third hierarchical level "$L_3$", and a fourth hierarchical level "$L_4$". The first hierarchical level "$L_1$" comprises a set of nodes, such as a "node1", a "node2", and a "node3", the second hierarchical level "$L_2$" comprises a set of nodes, such as a "node12", a "node13", a "node21", a "node23", a "node31", and a "node32". The third hierarchical level "$L_3$" comprises a set of nodes, such as a "node123", a "node132", a "node213", a "node231", a "node312", and a "node321". The first hierarchical level "$L_1$", the second hierarchical level "$L_2$", and the third hierarchical level "$L_3$" represent the set of services, provided by corresponding nodes. Further, the zeroth hierarchical level "$L_0$" represents a receiving node, and the fourth hierarchical level "$L_4$" represents a transmitting node.

In an embodiment, the repository management unit 206 may be configured to maintain the hierarchical structure 400 of the plurality of services in the repository. A person with ordinary skills in the art will understand that for brevity, the plurality of hierarchical levels in the hierarchical structure 400 include five hierarchical levels only. Notwithstanding, the disclosure may not be so limited, and the plurality of hierarchical levels in the hierarchical structure 400 may include more than five hierarchical levels, without deviation from the scope of the disclosure. For example, if the repository includes "n" number of services, the repository management unit 206 may maintain "n+2" hierarchical levels in the hierarchical structure 400. In an embodiment, each node from the first hierarchical level "$L_1$" to the hierarchical level "$L_{n+2}$" corresponds to the child node of the receiving node (at the zeroth hierarchical level "$L_0$"). Further, each node from the zeroth hierarchical level "$L_0$" to the hierarchical level "$L_{n+1}$" corresponds to the parent node of the transmitting node (at the second hierarchical level "$L_{n+2}$").

In an embodiment, the "node12" and the "node13" of the second hierarchical level "$L_2$" represent child nodes of the "node1" of the first hierarchical level "$L_1$". The "node21" and the "node23" of the second hierarchical level "$L_2$" represent the child nodes of the "node2" of the first hierarchical level "$L_1$". Similarly, the "node31" and the "node32" of the second hierarchical level "$L_2$" represents child nodes of the "node3" of the first hierarchical level "$L_1$".

In an embodiment, each node in the first hierarchical level "$L_1$" represents the first set of services. The first set of services of the "node1", "node2", and "node3" may be different from each other. For example, the "node1" represents a hotel booking service, the "node2" represents a flight booking service, and the "node3" represents a cab booking service. In an embodiment, each node in the second hierarchical level "$L_2$" represents the combination of services of the plurality of services. In an embodiment, the combination of services represented by each node in the second hierarchical level "$L_2$" may be determined based on composability of services represented by each node in the first hierarchical level "$L_1$". The composability of services may be defined based on interaction of the services represented by each node in the first hierarchical level "$L_1$", with each other. For example, the hotel booking service represented by the "node1" may be interactive with the flight booking service represented by the "node2" and may be combined with each other. Therefore, "node12" may represent the combination of services of the "node1" and the "node2", which indicates that the service of the "node1" may be followed by the service of the "node2". Further, the hotel booking service represented by the "node1" may interact with the cab booking service represented by the "node3" and may be combined with each other. Therefore, the "node13" may represent the combination of services of the "node1" and the "node3", which indicated that the service of the "node1" may be followed by the service of the "node3". In a similar way, the "node21", "node23", "node31", and "node32" represent the combination of services that may be determined based on composability of services represented by each node in the first hierarchical level "$L_1$". Further, the "node123", "node132", "node213", "node231", "node312", and "node321" may represent the combination of services that may be determined based on composability of services represented by each node in the first hierarchical level "$L_1$". A person having ordinary skills in the art would understand that the composability of the services may be determined by using one or more web service composition techniques known in the art.

In an embodiment, each node in the set of nodes in each hierarchical level of the plurality of hierarchical levels, stores a first semantic information and a second semantic information. In an embodiment, the "node1" may store the first semantic information "Sem(1)" and the second semantic information "SemSubTree(1)". The first semantic information "Sem(1)" associated with the "node1" may correspond to a domain ontology graph of the first set of services associated with the "node1". The second semantic information "SemSubTree(1)" associated with the "node1" may correspond to a domain ontology graph of the combination of services represented by the "node12" and the "node13". Further, the "node12" may store the first semantic information "Sem(12)" and the second semantic information "SemSubTree(12)". The first semantic information "Sem(12)" associated with the "node12" may correspond to a domain ontology graph of the first set of services associated with the "node12". The second semantic information "SemSubTree (12)" associated with the "node12" may correspond to a domain ontology graph of the combination of services starts with the "node12", to the transmitting node.

In an embodiment, the repository management unit 206 may be configured to update the repository when a new service is registered by the service provider. Similarly, the repository may be updated, when a service is deleted from the repository.

Figure 5:
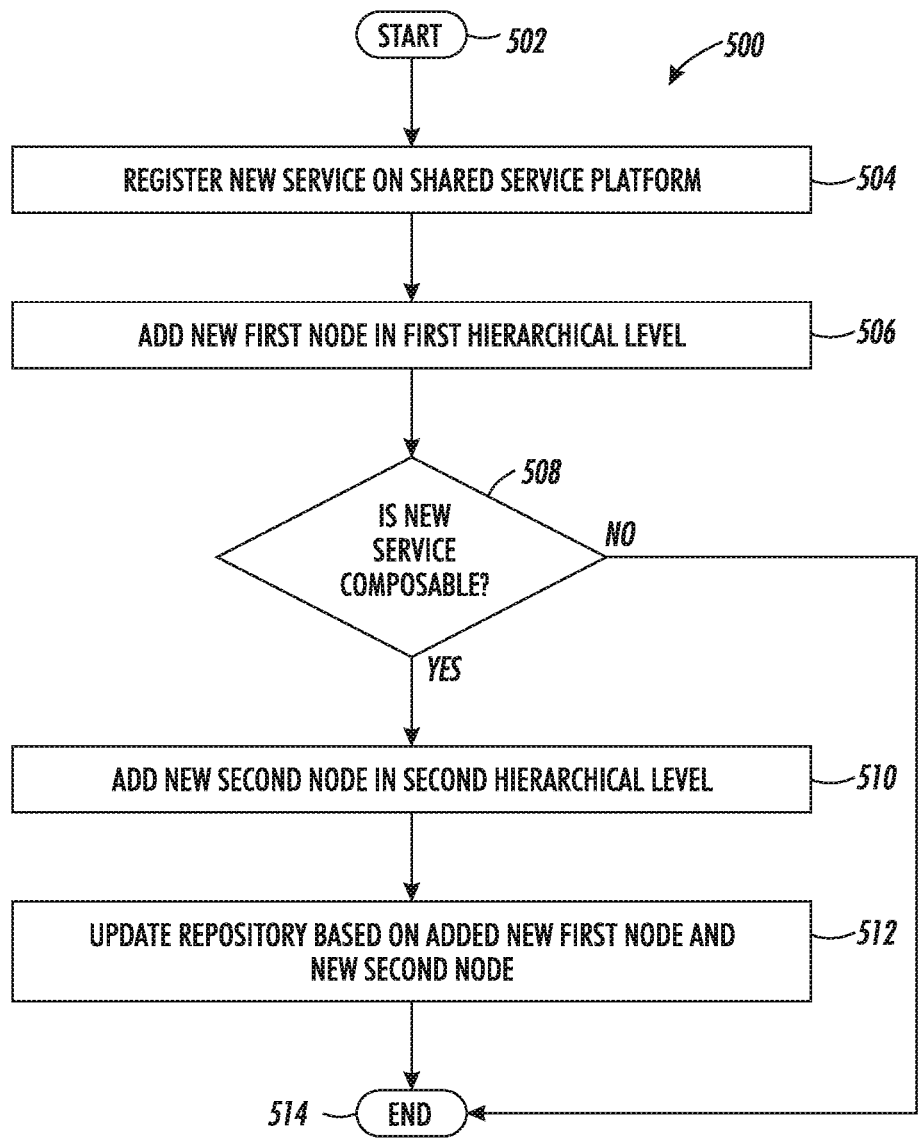
FIG. 5 illustrates a flowchart of another method for updating a repository, in accordance with at least one embodiment.

FIG. 5 illustrates a flowchart 500 of another method for updating the repository, in accordance with at least one embodiment. The flowchart 500 is explained in conjunction with FIGS. 1-4. The method starts at step 502 and proceeds to step 504. At step 504, a new service is registered at the shared service platform. In an embodiment, the new service may be registered by the service provider, using the service provider computing device 104. For example, the new service may be "a car exchange service" that is registered by the service provider.

After registration of the new service, at step 506, a new first node is added in the first hierarchical level "$L_1$". In an embodiment, the repository management unit 206 may add the new first node, such as "node4", in the first hierarchical level "$L_1$". For example, the "node4" may represent "the car exchange service". The "node4" may store the first semantic information (i.e., domain ontology graph of the car exchange service) that may be determined in accordance with the equation (1) (FIG. 3). In an embodiment, the second semantic information of the "node4" may be determined in accordance with the equation (2) (FIG. 3).

Further, at step 508, composability of the new service is checked. In an embodiment, the repository management unit 206 may check whether the new service represented by the "node4" is composable with the set of services represented by the "node1", "node2", and "node3", respectively, in the first hierarchical level "$L_1$". If the new service is composable, step 510 is performed, else end step 514 is performed. A person having ordinary skills in the art would understand that the composability of the new service may be checked by using one or more service composition techniques, such as, a "Distributed Algorithm for Web Service Composition (DPAWSC)", known in the prior art.

At step 510, a new second node is added in the second hierarchical level "$L_2$". In an embodiment, the repository management unit 206 may add the new second node, such as "node43" in the second hierarchical level "$L_2$", when the service represented by the "node4" and the service represented by the "node3" are composable. For example, "the car exchange service" represented by the "node4" may be composable with "the cab booking service" represented by the "node3". The new second node, "node43", may store the first semantic information (i.e., domain ontology graph of the car exchange service and the cab booking service) that may be determined in accordance with the equation (1) (FIG. 3). In an embodiment, one or more new second nodes may be added in the second hierarchical level "$L_2$", when the service represented by the "node4" is composable with the service represented by the "node1" and "node2". In a similar way, one or more new third nodes may be added in the third hierarchical level "$L_3$", when the service represented by the "node4" is composable with the services represented by the set of nodes (i.e., the "node12", "node13", "node21", "node23", "node31", and "node32") in the hierarchical level "$L_2$". Further, the second semantic information of the new second node "node43", may be updated in accordance with the equation (2) (FIG. 3), if the one or more new third nodes are added in the third hierarchical level "$L_3$".

At step 512, the repository is updated based on addition of the new nodes, such as the new first node (i.e., "node4") and the new second node (i.e., "node43"). In an embodiment, the repository management unit 206 may update the repository based on addition of the new first node, the new second node, and the like, in the hierarchical structure of the repository. Control passes to end step 514.

A person ordinary skilled in the art will understand that the repository may be updated in a similar way when a service is deleted from the repository, without any deviation from the scope of the disclosure.

FIGS. 6A-6D are flow diagrams that illustrate an exemplary scenario of a method for recommendation of a succession of one or more services as an itinerary, in accordance with at least one embodiment. FIGS. 6A-6D are explained in conjunction with FIGS. 1-5. FIGS. 6A-6D represent the hierarchical structure 400 of the repository, as discussed above in FIG. 4.

Figure 6A:
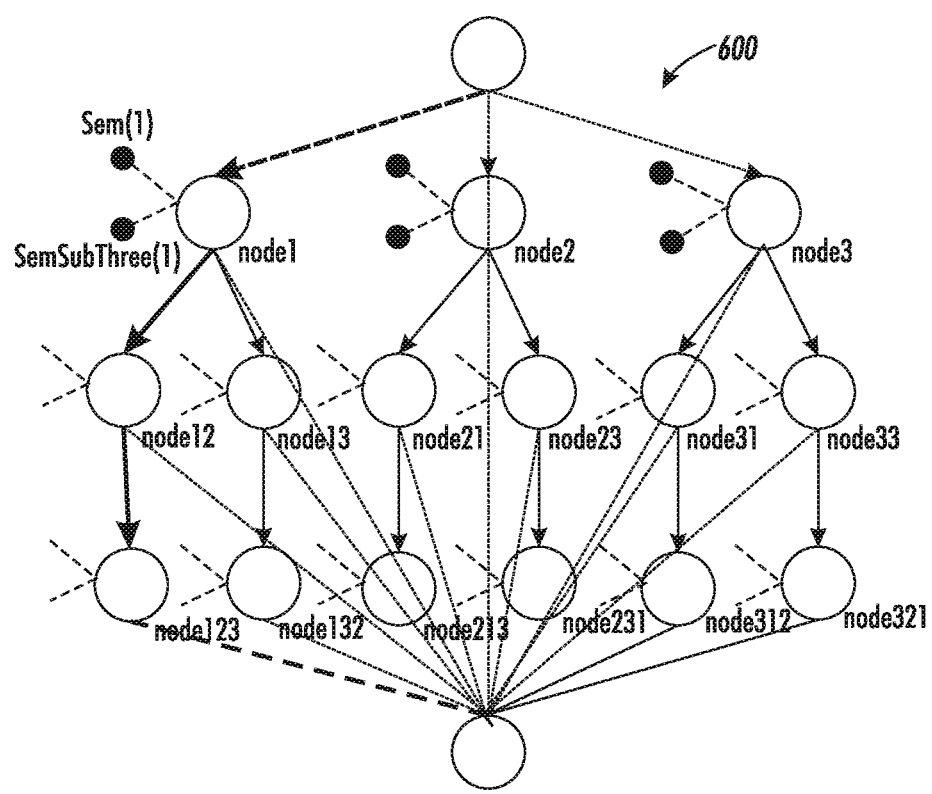
FIGS. 6A to 6D are flow diagrams that illustrate an exemplary scenario of a method for recommendation of a succession of one or more services for an itinerary, in accordance with at least one embodiment.

In an exemplary scenario, as illustrated in FIG. 6A, the processor 202 in conjunction with the transceiver 214 may be configured to receive the query from the user. The user may send the query, such as "I prefer a hotel that provides a cab facility and flight booking service during the stay", through the shared service platform. In an embodiment, the query may be received by the receiving node, which may transfer the query to the first node, such as "node1". In an embodiment, the comparison unit 208 may be configured to compare the query at each node in the hierarchical structure 400, by utilizing one or more search algorithm (that may not be limited to A* algorithm, known in the art). Before comparing the query at each node in the hierarchical structure 400, the processor 202 may identify one or more keywords, such as "hotel", "cab facility", and "flight booking", from the query.

The first node "node1", may represent the hotel booking service. Further, the "node1" may store the first semantic information "Sem(1)" and the second semantic information "SemSubTree(1)". A Table 3 provided below illustrates the "Sem(1)" and "SemSubTree(1)" of the "node1":

TABLE 3

Illustration of "Sem(1)" and "SemSubTree(1)" of the "node1"

| Node | Sem(1) | SemSubTree(1) |
|---|---|---|
| Node1 | Hotel booking | (Hotel and Flight) booking |
|  | Room reservation | (Hotel and Cab) booking |
|  | Hotel contact information | (Hotel and Flight) contact information |
|  | Hotel general information | (Hotel and Flight) facilities |
|  | Hotel facilities |  |
|  | Nearby POIs |  |

In an embodiment, the comparison unit 208 may compare the query to the first semantic information "Sem(1)" of the "node1". For example, the identified one or more keywords, such as "hotel", "cab facility", and "flight booking", may be compared with the first semantic information "Sem(1)" of the "node1". Based on the comparison, the first matching score "$s_1$" for the "node1" may be determined. Further, the first matching score "$s_1$" of the "node1" may be compared with the threshold score "$s_t$". It may be observed from the Table 3 that the first semantic information "Sem(1)" of the "node1" fails to match with the query, i.e., the identified one or more keywords such as, "hotel", "cab facility", and "flight booking", fail to match with the "Sem(1)" of the "node1". Hence, the first matching score "$s_1$" of the first node "node1" will be less than the threshold score "$s_t$". Therefore, the selection unit 210, will not select the "node1".

Subsequently, the comparison unit 208 may compare the query to the second semantic information "SemSubTree(1)" of the "node1". Based on the comparison, the second matching score "$s_2$" for the "node1" may be determined. Further, the second matching score "$s_2$" of the "node1" may be compared with the threshold score "$s_t$". It may be observed from the Table 3 that the "SemSubtree(1)" of the "node1" matches with the query, i.e., the identified one or more keywords, such as "hotel", "cab facility", and "flight booking", match with the "SemSubTree(1)" of the "node1". Hence, the second matching score "$s_2$" of the "node1" will be greater than the threshold score "$s_t$". Therefore, the selection unit 210 may select child nodes of the "node1", as the second matching score "$s_2$" of the "node1" is greater than the threshold score "$s_t$".

In an embodiment, the query may be transferred to the second node, such as "node12". The "node12" may store the first semantic information "Sem(12)" and the second semantic information "SemSubTree(12)". Table 4 provided below illustrates the "Sem(12)" and the "SemSubTree(12)" of the "node12:

TABLE 4

Illustration of Sem(12) and SemSubTree(12) of the node12

| Node | Sem(12) | SemSubTree(12) |
|---|---|---|
| Node12 | (Hotel and Flight) booking (Hotel and flight) contact information (Hotel and flight) facilities | (Hotel and Flight and Cab) booking (Hotel and Flight and Cab) contact information (Hotel and Flight and Cab) facilities |

In an embodiment, the query may be compared with the first semantic information "Sem(12)" of the "node12". Based on the comparison, the first matching score "53" for the "node12" may be determined. Further, the first matching score "53" of the "node12" may be compared with the threshold score "$s_t$". It may be observed from Table 4 that the first semantic information "Sem(12)" of the "node12" fails to match with the query, i.e., the identified one or more keywords, such as "hotel", "cab facility", and "flight booking", fail to match with the "Sem(12)" of the "node12". Hence, the first matching score "$s_3$" of the "node12" will be less than the threshold score "$s_t$". Therefore, the selection unit 210, will not select the "node12".

Subsequently, the comparison unit 208 may compare the query to the second semantic information "SemSubTree(12)" of the "node12". Based on the comparison, the second matching score "$s_4$" for the "node12" may be determined.

Further, the second matching score "$s_4$" of the "node12" may be compared with the threshold score "$s_t$". It may be observed from the Table 4 that the "SemSubtree(12)" of the "node12" matches with the query, i.e., the identified one or more keywords, such as "hotel", "cab facility", and "flight booking", match with the "SemSubTree(12)" of the "node12". Hence, the second matching score "$s_4$" of the "node12" will be greater than the threshold score "$s_t$". Therefore, the selection unit 210 will select the child nodes of the "node12".

In an embodiment, the query may be transferred to the "node123". The "node123" may store the first semantic information "Sem(123)" and the second semantic information "SemSubTree(123)". Table 5 provided below illustrates the "Sem(123)" and the "SemSubTree(123)" of the "node123":

TABLE 5

Illustration of "Sem(123)" and "SemSubTree(123)" of the "node123"

| Node | Sem(123) | SemSubTree(123) |
|---|---|---|
| Node123 | (Hotel and Flight and Cab) booking (Hotel and Flight and Cab) contact information (Hotel and Flight and Cab) facilities | |

In an embodiment, the query may be compared with the first semantic information "Sem(123)" of the "node123". Based on the comparison, the first matching score "55" for the "node123" may be determined. Further, the first matching score "$s_5$" of the "node123" may be compared with the threshold score "$s_t$". It may be observed from the Table 5 that the first semantic information "Sem(123)" of the "node123" matches with the query, i.e., the identified one or more keywords, such as "hotel", "cab facility", and "flight booking", match with the "Sem(123)" of the "node123". Hence, the first matching score "$s_5$" of the "node123" will be greater than the threshold score "$s_t$". Therefore, the selection unit 210 will select the "node123". In an embodiment, after selection of the "node123", the recommendation unit 212 may generate the SML to include the "node 123". Such recommendation corresponds to the combination of services that represents an ordered execution of the one or more services (i.e., first set of services represented by the "node1", followed by combination of services represented by the "node12", further followed by another combination of services represented by the "node123") and may be referred to as a first workflow.

Figure 6B:
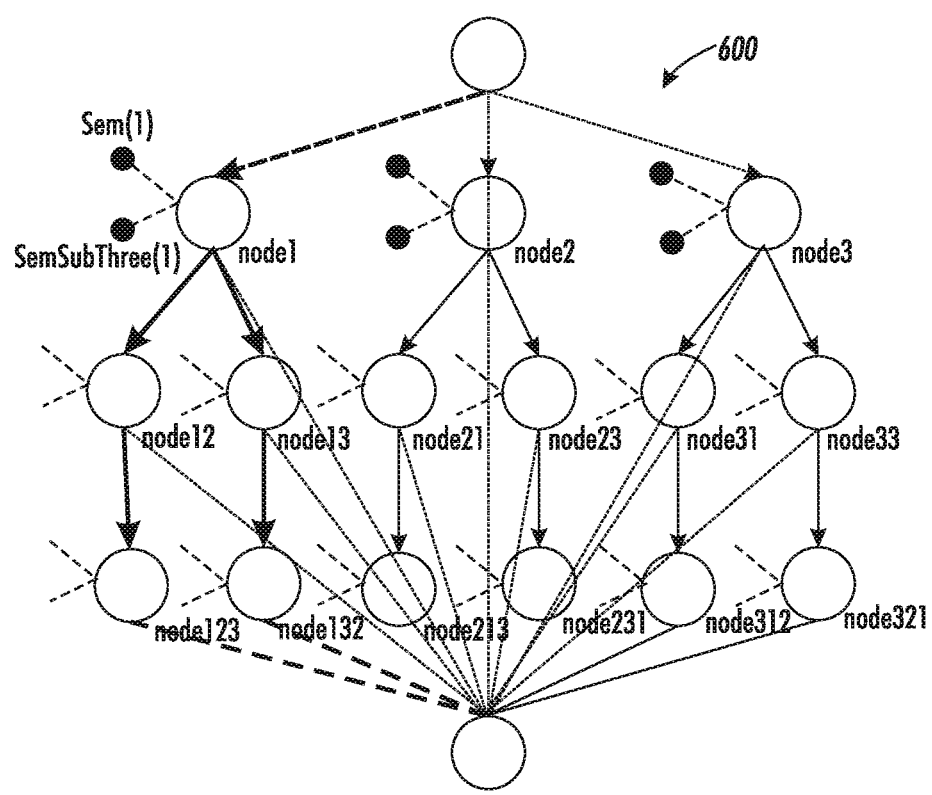

In another exemplary scenario, as illustrated in FIG. 6B, the query may be transmitted to the "node13". The "node13" may stores the first semantic information "Sem(13)" and the second semantic information "SemSubTree(13)". Table 6 provided below illustrates the "Sem(13)" and the "SemSubTree(13)" of the "node13";

TABLE 6

Illustration of "Sem(13)" and "SemSubTree(13)" of the "node13"

| Node | Sem(13) | SemSubTree(13) |
|---|---|---|
| Node13 | (Hotel and Cab) booking (Hotel and Cab) contact information (Hotel and Cab) facilities | (Hotel and Cab and Flight) booking (Hotel and Cab and Flight) contact information (Hotel and Cab and Flight) facilities |

In an embodiment, the query may be compared with the first semantic information "Sem(13)" of the "node13". Based on the comparison, the first matching score "56" for the "node13" may be determined. Further, the first matching score "56" of the "node13" may be compared with the threshold score "$s_t$". It may be observed from Table 6 that the first semantic information "Sem(13)" of the "node13" fails to match with the query, i.e., the identified one or more keywords such as, "hotel", "cab facility", and "flight booking", fails to match with the "Sem(13)" of the "node13". Hence, the first matching score "$s_6$" of the "node13" will be less than the threshold score "$s_t$". Therefore, the selection unit 210, will not select the "node13".

Subsequently, the comparison unit 208 may compare the query to the second semantic information "SemSubTree(13)" of the "node13". Based on the comparison, the second matching score "$s_7$" for the "node13" may be determined. Further, the second matching score "$s_7$" of the "node13" may be compared with the threshold score "$s_t$". It may be observed from the Table 6 that the "SemSubtree(13)" of the "node13" matches with the query, i.e., the identified one or more keywords, such as "hotel", "cab facility", and "flight booking", match with the "SemSubTree(13)" of the "node13". Hence, the second matching score "$s_7$" of the "node13" will be greater than the threshold score "$s_t$". Therefore, the selection unit 210 may select the child nodes of the "node13".

In an embodiment, the query may be transferred to the "node132". The "node132" may stores the first semantic information "Sem(132)" and the second semantic information "SemSubTree(132)". Table 7 provided below illustrates the "Sem(132)" and the "SemSubTree(132)" of the "node132":

TABLE 7

Illustration of "Sem(132)" and "SemSubTree(132)" of the "node132"

| Node | Sem(132) | SemSubTree(132) |
|---|---|---|
| Node132 | (Hotel and Cab and Flight) booking<br>(Hotel and Cab and Flight) contact information<br>(Hotel and Cab and Flight) facilities | |

In an embodiment, the query may be compared with the first semantic information "Sem(132)" of the "node132". Based on the comparison, the first matching score "58" for the "node132" may be determined. Further, the first matching score "58" of the "node123" may be compared with the threshold score "$s_t$". It may be observed from Table 7 that the first semantic information "Sem(132)" of the "node132" matches with the query, i.e., the identified one or more keywords such as, "hotel", "cab facility", and "flight booking", match with the "Sem(132)" of the "node132". Hence, the first matching score "$s_8$" of the "node132" will be greater than the threshold score "$s_t$". Therefore, the selection unit 210, will select the "node132".

After selection of the "node 132", the recommendation unit 212 may update the SML to include the "node132". Such recommendation corresponds to the combination of services that represents an ordered execution of the one or more services (i.e., first set of services represented by the "node1", followed by combination of services represented by the "node13", further followed by another combination of services represented by the "node132") and may be referred to as a second workflow.

Figure 6C:
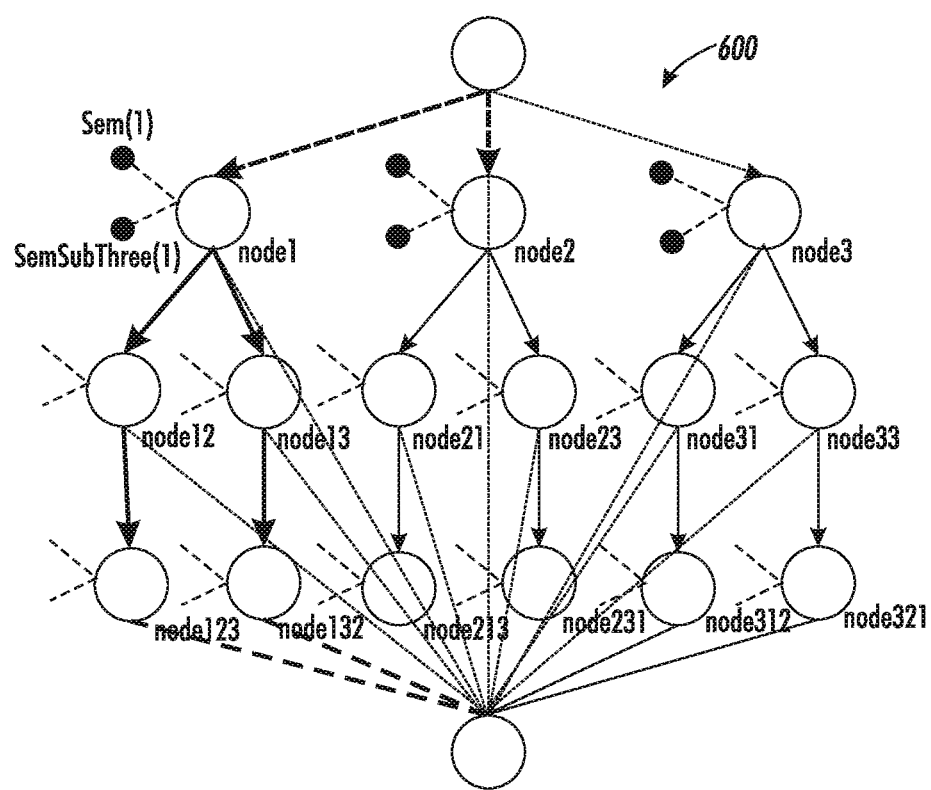

In another exemplary scenario, as illustrated in FIG. 6C, the query may be transferred to the "node2". The "node2" may stores the first semantic information "Sem(2)" and the second semantic information "SemSubTree(2)". Table 8 provided below illustrates the "Sem(2)" and the "SemSub-Tree(2)" of the "node2":

TABLE 8

Illustration of "Sem(2)" and "SemSubTree(2)" of the "node2"

| Node | Sem(2) | SemSubTree(2) |
|---|---|---|
| Node2 | Flight booking | (Flight and Hotel) booking |
| | Flight reservation | (Flight and Cab) booking |
| | Flight contact information | (Flight and Hotel) contact information |
| | Flight general information | (Flight and Hotel) facilities |
| | Flight facilities | (Flight and Cab) facilities |

In an embodiment, the comparison unit 208 may compare the query to the first semantic information "Sem(2)" of the "node2". Based on the comparison, the first matching score "$s_9$" for the "node2" may be determined. Further, the first matching score "$s_9$" of the "node2" may be compared with the threshold score "$s_t$". It may be observed from Table 8 that the first semantic information "Sem(2)" of the "node2" fails to match with the query, i.e., the identified one or more keywords such as, "hotel", "cab facility", and "flight booking", fails to match with the "Sem(2)" of the "node2". Hence, the first matching score "$s_9$" of the "node2" will be less than the threshold score "$s_t$". Therefore, the selection unit 210, will not select the "node2".

Subsequently, the comparison unit 208 may compare the query to the second semantic information "SemSubTree(2)" of the "node2". Based on the comparison, the second matching score "$s_{10}$" for the "node2" may be determined. Further, the second matching score "$s_{10}$" of the "node2" may be compared with the threshold score "$s_t$". It may be observed from the Table 8 that the "SemSubtree(2)" of the "node2" fails to match with the query, i.e., the identified one or more keywords such as, "hotel", "cab facility", and "flight booking", fails to match with the "SemSubTree(2)" of the "node2". Hence, the second matching score "$s_{10}$" of the "node2" will be less than the threshold score "$s_t$". Therefore, the selection unit 210, will discard the "node2".

Figure 6D:
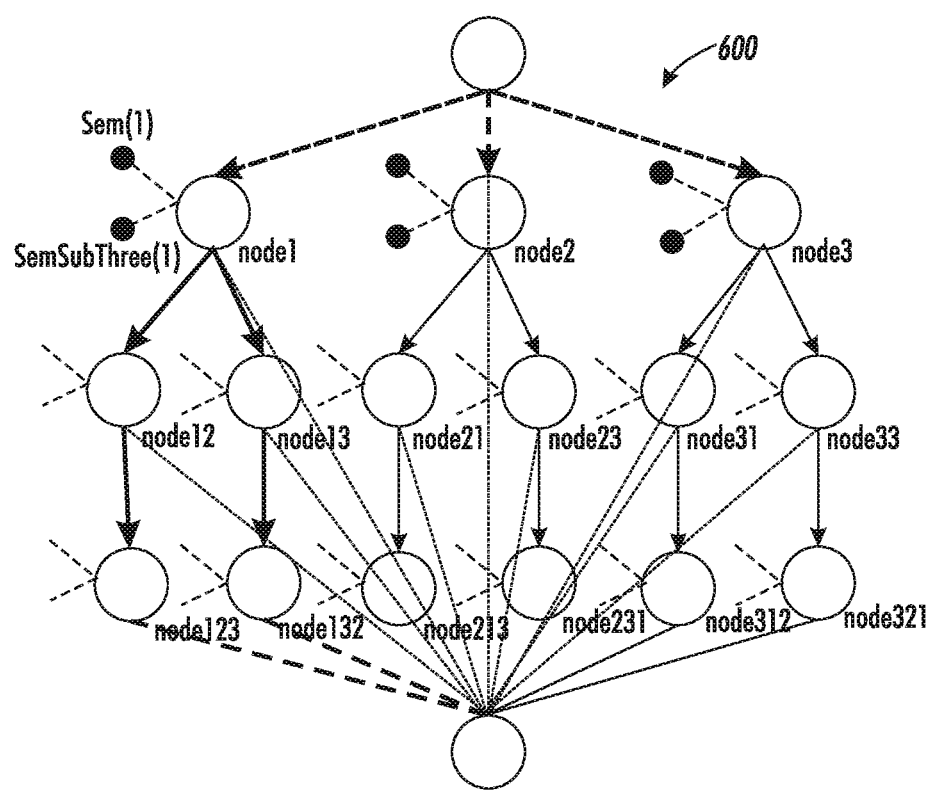

In another exemplary scenario, as illustrated in FIG. 6D, the query may be transmitted to the "node3". The "node3" may stores the first semantic information "Sem(3)" and the second semantic information "SemSubTree(3)". A Table 9 provided below illustrates the "Sem(3)" and the "SemSub-Tree(3)" of the "node3":

TABLE 9

Illustration of "Sem(3)" and "SemSubTree(3)" of the "node3"

| Node | Sem(3) | SemSubTree(3) |
|---|---|---|
| Node3 | Cab booking | (Cab and Hotel) booking |
| | Cab reservation | (Cab and Flight) booking |
| | Cab contact information | (Cab and Hotel) contact information |
| | Cab general information | (Cab and Hotel) facilities |
| | Cab facilities | (Cab and Flight) facilities |

It will be apparent to a person having ordinary skills in the art that the above Tables 3-9 have been provided only for illustration purposes and should not limit the scope of the invention to the listed services only. For example, the listed services included in Tables 3-9 may be different from the depicted services.

In an embodiment, the comparison unit 208 may compare the query to the first semantic information "Sem(3)" of the "node3". Based on the comparison, the first matching score "$s_{11}$" for the "node3" may be determined. Further, the first matching score "$s_{11}$" of the "node3" may be compared with the threshold score "$s_t$". It may be observed from Table 9 that the first semantic information "Sem(3)" of the "node3" fails to match with the query, i.e., the identified one or more keywords such as, "hotel", "cab facility", and "flight booking", fails to match with the "Sem(3)" of the "node3". Hence, the first matching score "$s_{11}$" of the "node3" will be less than the threshold score "$s_t$". Therefore, the selection unit 210, will not select the "node3".

Subsequently, the comparison unit 208 may compare the query to the second semantic information "SemSubTree(3)" of the "node3". Based on the comparison, the second matching score "$s_{12}$" for the "node3" may be determined. Further, the second matching score "$s_{12}$" of the "node3" may be compared with the threshold score "$s_t$". It may be observed from the Table 9 that the "SemSubtree(3)" of the "node3" fails to match with the query, i.e., the identified one or more keywords such as, "hotel", "cab facility", and "flight booking", fails to match with the "SemSubTree(3)" of the "node3". Hence, the second matching score "$s_{12}$" of the "node3" will be less than the threshold score "$s_t$". Therefore, the selection unit 210, will discard the "node3".

Subsequently, the transmitting node of the fourth hierarchical level "$L_4$" in the hierarchical structure 400, may transmit the selected nodes, i.e., the "node 123" and the "node 132", to the recommendation unit 212. Thereafter, the recommendation unit 212 may sort the "node132" on the top of the list and the "node123" at the bottom of the list, based on the preference of the user in the query. Thus, the second workflow, represented by the combination of services by the node "132" may be referred to as a finalized workflow. Further, the recommendation unit 212 may recommend the SML, in other words the finalized workflow, as the itinerary, to the user. In an embodiment, the SML may be displayed on the user-computing device 102.

The disclosed embodiments encompass numerous advantages. Various embodiments of the disclosure lead to a method and a system for recommendation of a succession of one or more services for a service workflow, such as an itinerary. Through various embodiments of the disclosure, the query is compared with each node in the set of nodes in each hierarchal level of the hierarchal structure. Each node stores a first semantic information and a second semantic information, which indicates that each node have information of their child nodes. Further, the query will be compared with a child node only if the query matches with the second semantic information of the corresponding parent node. Based on the comparison of the query, a matching score is determined for the corresponding node. Further, the matching score is compared with a threshold score. Based on the comparison, the node is either selected or discarded. Further, the combination of services represented by the selected one or more nodes are recommended, as the service workflow, to the user. Therefore, it is advantageous to recommend a combination of services to the user, if a single service fails to serve the requirement of the query.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

To process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described may also be implemented using only software programming or using only hardware or by a varying combination of the two techniques. The disclosure is independent of the programming language and the operating system used in the computers. The instructions for the disclosure may be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure may also be implemented in various operating systems and platforms including, but not limited to, 'Unix', DOS', 'Android', 'Symbian', and 'Linux'.

The programmable instructions may be stored and transmitted on a computer-readable medium. The disclosure may also be embodied in a computer program product comprising a computer-readable medium, or with any product capable of implementing the above methods and systems, or the numerous possible variations thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

Various embodiments of the methods and systems for recommendation of a succession of one or more services for a service workflow, have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims may encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for recommendation of a succession of one or more services for an itinerary, the method comprising:
    receiving, by one or more processors, a query to retrieve one or more services for an itinerary from a repository of a plurality of services stored in a hierarchical structure;
    wherein the hierarchical structure comprises a plurality of hierarchical levels, each hierarchical level in the plurality of hierarchical levels comprising a set of nodes;
    wherein a first node in the set of nodes in a first hierarchical level of the plurality of hierarchical levels, represents a first set of services of the plurality of services;
    wherein a second node in the set of nodes in a second hierarchical level of the plurality of hierarchical levels, represents a combination of services, in succession, of the plurality of services, wherein the combination of services comprises at least the first set of services and other services from the plurality of services, wherein the second node is a child node of the first node; and
    wherein each node in the set of nodes in each hierarchical level of the plurality of hierarchical levels, stores a first semantic information related to the first set of services represented by the first node and a second semantic information related to the combination of services represented by the second node;
    comparing, by the one or more processors, the query with the first semantic information and the second semantic information associated with the first node;
    determining, by the one or more processors, a first matching score for the first node, based on the comparison of the query with the first semantic information associated with the first node;
    comparing, by the one or more processors, the query with first semantic information associated with the second node;
    determining, by the one or more processors, a first matching score for the second node, based on the comparison of the query with the first semantic information associated with the second node;
    selecting, by the one or more processors, the first node or the second node based on the first matching score for the first node and the first matching score for the second node; and
    recommending, by the one or more processors, the first set of services or the combination of services, as the itinerary, associated with the selected node,
    wherein the second semantic information is stored in a recursive manner as:

SemSubTree($i$)=$U_{j \in child(i)}$Sem($j$)$U_{j \in child(i)}$SemSubTree($j$), where
        child($i$) represents the set of child nodes of the selected node,
        Sem($j$) represents the first semantic information of the selected node, and
        SemSubTree($j$) represents the second semantic information of the $j^{th}$ node.

2. The method of claim 1, further comprising selecting, by the one or more processors, the first node, when the first matching score exceeds a threshold score.

3. The method of claim 1, further comprising comparing, by the one or more processors, the query with the second semantic information associated with the first node, when the first matching score is less than the threshold score.

4. The method of claim 1, further comprising determining, by the one or more processors, a second matching score for the first node, based on the comparison of the query with the second semantic information associated with the first node.

5. The method of claim 1, wherein the combination of services are processed such that the first set of services is processed first, followed by the other services of the plurality of services.

6. The method of claim 1, wherein the first semantic information associated with the first node, correspond to a domain ontology graph of the first set of services associated with the first node.

7. The method of claim 1, wherein the second semantic information associated with the first node, correspond to a domain ontology graph of the combination of services represented by the second node.

8. The method of claim 1, wherein a node is associated with one or more of a transportation mode selection service, a transportation booking service, a hotel booking service, a customer care service, and a communication service, wherein the node corresponds to the first node or the second node.

9. A method for recommendation of a succession of one or more services for a service workflow, the method comprising:
receiving, by one or more processors, a query to retrieve one or more services for an itinerary from a repository of a plurality of services stored in a hierarchical structure;
wherein the hierarchical structure comprises a plurality of hierarchical levels, each hierarchical level in the plurality of hierarchical levels comprising a set of nodes;
wherein a first node in the set of nodes in a first hierarchical level of the plurality of hierarchical levels, represents a first set of services of the plurality of services;
wherein a second node in the set of nodes in a second hierarchical level of the plurality of hierarchical levels, represents a combination of services, in succession, of the plurality of services, wherein the combination of services comprises at least the first set of services and other services from the plurality of services, wherein the second node is a child node of the first node; and
wherein each node in the set of nodes in each hierarchical level of the plurality of hierarchical levels, stores a first semantic information related to the first set of services represented by the first node and a second semantic information related to the combination of services represented by the second node;
comparing, by the one or more processors, the query with the first semantic information and the second semantic information associated with the first node;
determining, by the one or more processors, a first matching score for the first node, based on the comparison of the query with the first semantic information associated with the first node;
comparing, by the one or more processors, the query with first semantic information associated with the second node;
determining, by the one or more processors, a first matching score for the second node, based on the comparison of the query with the first semantic information associated with the second node;
selecting, by the one or more processors, the first node or the second node based on the first matching score for the first node and the first matching score for the second node; and
recommending, by the one or more processors, the first set of services or the combination of services, as the service workflow, associated with the selected node,
wherein the second semantic information is stored in a recursive manner as:

$$\text{SemSubTree}(i) = U_{j \in child(i)} \text{Sem}(j) U_{j \in child(i)} \text{SemSubTree}(j),$$

where
child(i) represents the set of child nodes of the selected node,
Sem(j) represents the first semantic information of the selected node, and
SemSubTree(j) represents the second semantic information of the $j^{th}$ node.

10. A system for recommendation of a succession of one or more services for an itinerary, the system comprising:
one or more processors configured to:
receive a query to retrieve one or more services for an itinerary from a repository of a plurality of services stored in a hierarchical structure;
wherein the hierarchical structure comprises a plurality of hierarchical levels, each hierarchical level in the plurality of hierarchical levels comprising a set of nodes;
wherein a first node in the set of nodes in a first hierarchical level of the plurality of hierarchical levels, represents a first set of services, of the plurality of services;
wherein a second node in the set of nodes in a second hierarchical level of the plurality of hierarchical levels, represents a combination of services, in succession, of the plurality of services, wherein the combination of services comprises at least the first set of services and other services from the plurality of services, wherein the second node is a child node of the first node; and
wherein each node in the set of nodes in each hierarchical level of the plurality of hierarchical levels, stores a first semantic information related to the first set of services represented by the first node and a second semantic information related to the combination of services represented by the second node;
compare the query with the first semantic information and the second semantic information associated with the first node;
determine a first matching score for the first node, based on the comparison of the query with the first semantic information associated with the first node;
compare the query with first semantic information associated with the second node;
determine a first matching score for the second node, based on the comparison of the query with the first semantic information associated with the second node;
select the first node or the second node based on the first matching score for the first node and the first matching score for the second node; and
recommend the first set of services or the combination of services, as the itinerary, associated with the selected node,
wherein the second semantic information is stored in a recursive manner as:

$$\text{SemSubTree}(i) = U_{j \in child(i)} \text{Sem}(j) U_{j \in child(i)} \text{SemSubTree}(j),$$

where
child(i) represents the set of child nodes of the selected node,
Sem(j) represents the first semantic information of the selected node, and
SemSubTree(j) represents the second semantic information of the $j^{th}$ node.

11. The method of claim 10, wherein the one or more processors are further configured to select the first node, when the first matching score exceeds the threshold score.

12. The method of claim 10, wherein the one or more processors are further configured to compare the query with the second semantic information associated with the first node, when the first matching score is less than a threshold score.

13. The system of claim 10, wherein the one or more processors are further configured to determine a second matching score for the first node, based on comparison of the query with the second semantic information associated with the first node.

14. The system of claim 10, wherein the combination of services are processed such that the first set of services is processed first, followed by the other services of the plurality of services.

15. The system of claim 10, wherein the first semantic information associated with first node, correspond to a domain ontology graph of the first set of services associated with the first node.

16. The system of claim 10, wherein the second semantic information associated with the first node, correspond to a domain ontology graph of the combination of services represented by the second node.

17. A non-transitory computer-readable storage medium having stored thereon, a set of computer-executable instructions for recommendation of a succession of one or more services for an itinerary, wherein the set of computer-executable instructions is executable by a computer comprising one or more processors to perform steps comprising:

receiving a query to retrieve one or more services for an itinerary from a repository of a plurality of services stored in a hierarchical structure;

wherein the hierarchical structure comprises a plurality of hierarchical levels, each hierarchical level in the plurality of hierarchical levels comprising a set of nodes;

wherein a first node in the set of nodes in a first hierarchical level of the plurality of hierarchical levels, represents a first set of services of the plurality of services;

wherein a second node in the set of nodes in a second hierarchical level of the plurality of hierarchical levels, represents a combination of services, in succession, of the plurality of services, wherein the combination of services comprises at least the first set of services and other services from the plurality of services, wherein the second node is a child node of the first node; and wherein each node in the set of nodes in each hierarchical level of the plurality of hierarchical levels, stores a first semantic information related to the first set of services represented by the first node and a second semantic information related to the combination of services represented by the second node;

comparing the query with the first semantic information and the second semantic information associated with the first node;

determining a first matching score for the first node, based on the comparison of the query with the first semantic information associated with the first node;

comparing the query with first semantic information associated with the second node;

determining a first matching score for the second node, based on the comparison of the query with the first semantic information associated with the second node;

selecting the first node or the second node based on the first matching score for the first node and the first matching score for the second node; and recommending the first set of services or the combination of services, as the itinerary, associated with the selected node, wherein the second semantic information is stored in a recursive manner as:

$$\text{SemSubTree}(i) = U_{j \in child(i)} \text{Sem}(j) U_{j \in child(i)} \text{SemSubTree}(j),$$

where
child(i) represents the set of child nodes of the selected node,
Sem(j) represents the first semantic information of the selected node, and
SemSubTree(j) represents the second semantic information of the $j^{th}$ node.

* * * * *